Feb. 13, 1923.
G. GODDU.
MACHINE FOR OPERATING ON METALLIC FASTENINGS.
FILED FEB. 14, 1919.
1,444,871.
5 SHEETS—SHEET 4.
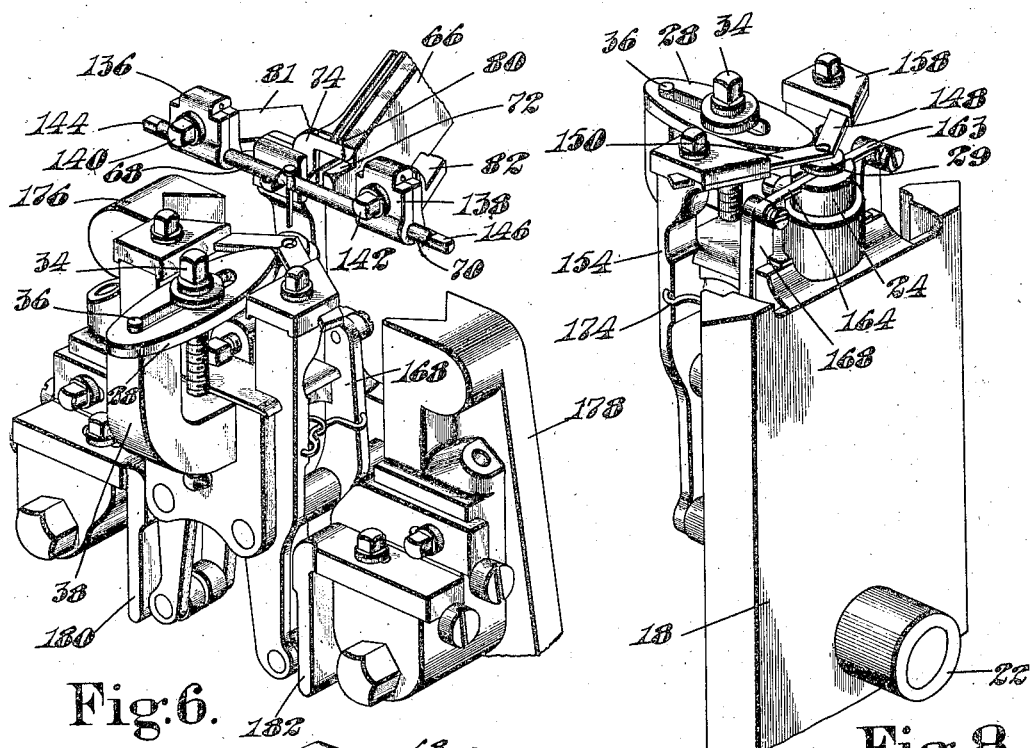
Fig. 6.
Fig. 8.
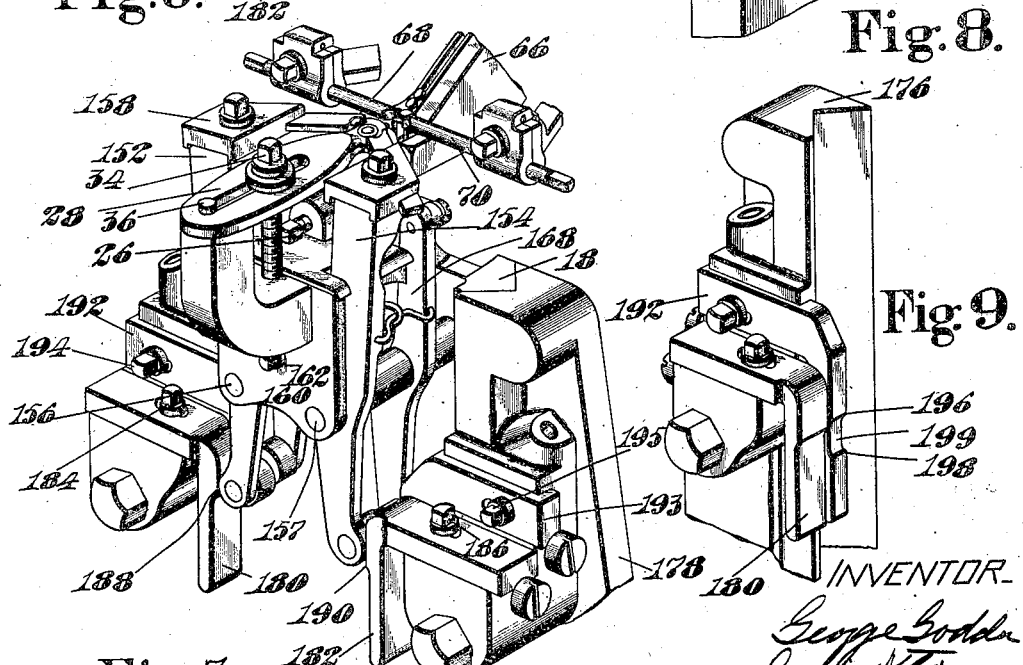
Fig. 7.
Fig. 9.
INVENTOR.
George Goddu
By his Attorney,
Nelson W. Howard Feb. 13, 1923.
G. GODDU.
MACHINE FOR OPERATING ON METALLIC FASTENINGS.
FILED FEB. 14, 1919.
1,444,871.
5 SHEETS—SHEET 5.
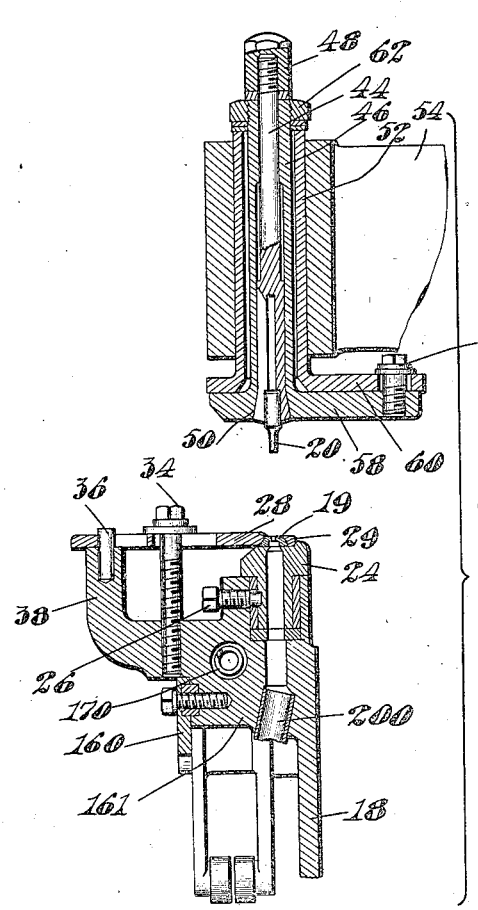
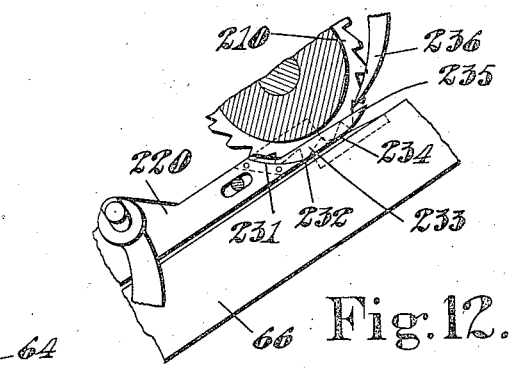
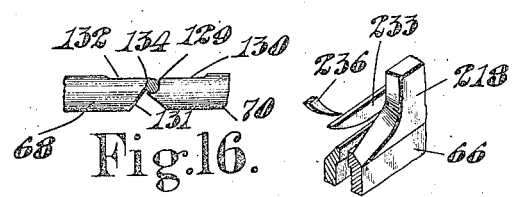
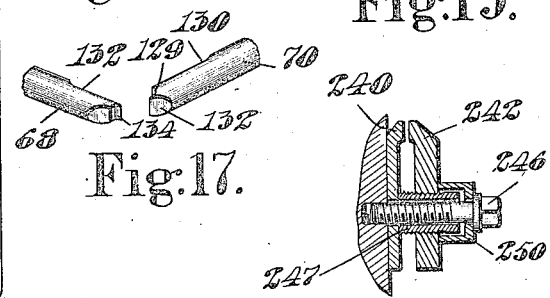
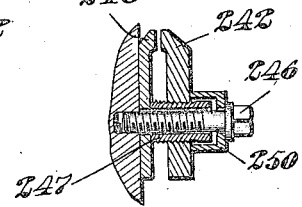
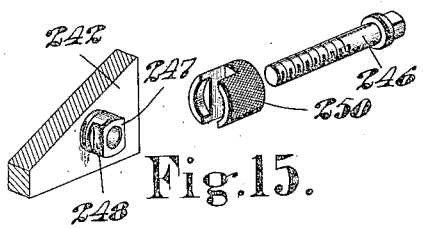
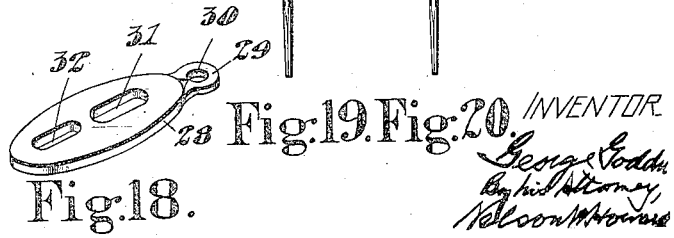

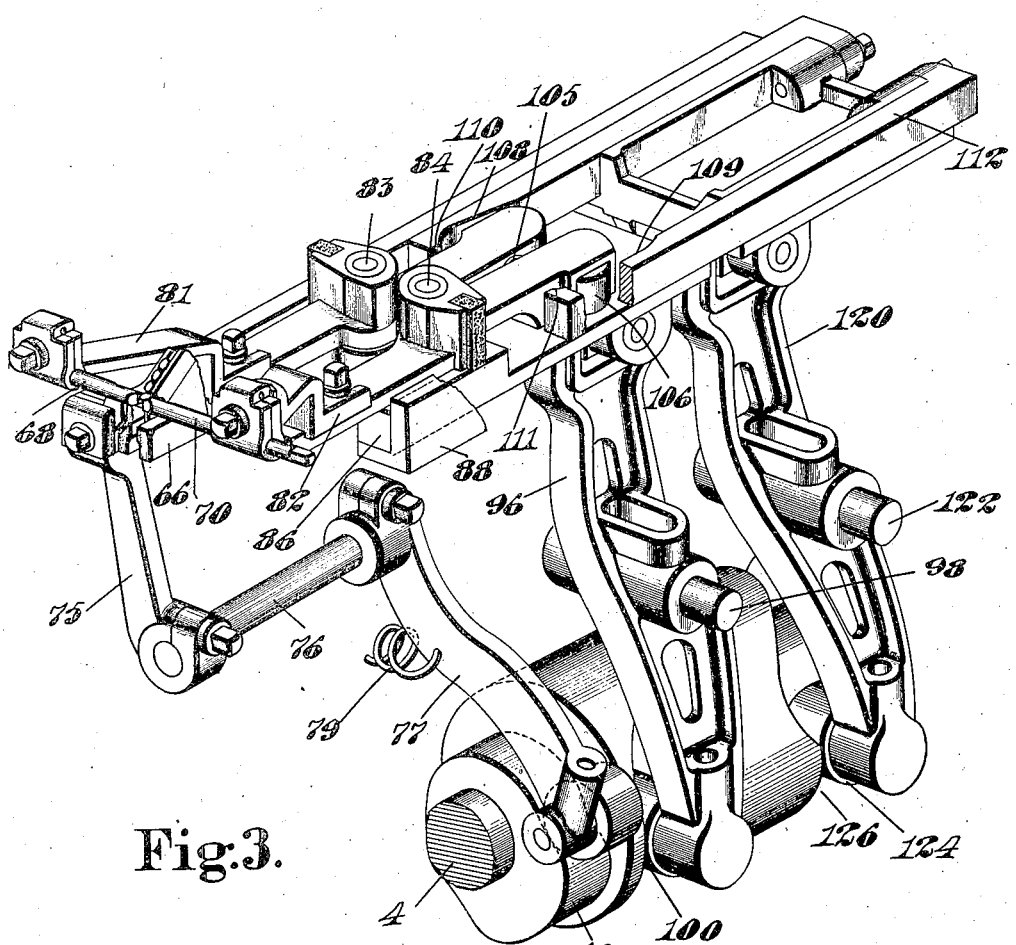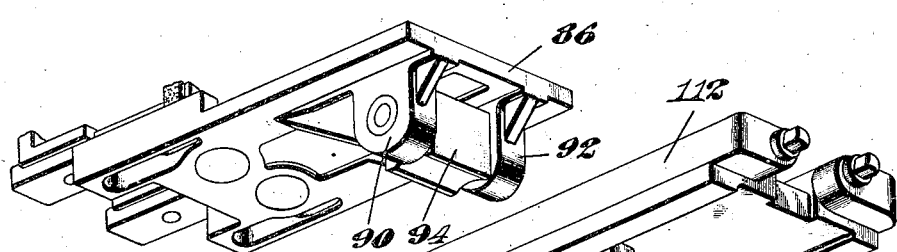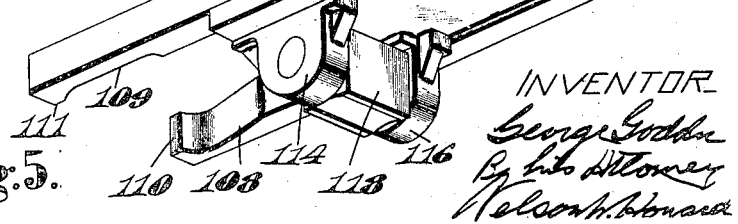

Patented Feb. 13, 1923.

1,444,871

UNITED STATES PATENT OFFICE.

GEORGE GODDU, OF WINCHESTER, MASSACHUSETTS, ASSIGNOR TO UNITED SHOE MACHINERY CORPORATION, OF PATERSON, NEW JERSEY, A CORPORATION OF NEW JERSEY.

MACHINE FOR OPERATING ON METALLIC FASTENINGS.

Application filed February 14, 1919. Serial No. 276,956.

*To all whom it may concern:*

Be it known that I, GEORGE GODDU, a citizen of the United States, residing at Winchester, in the county of Middlesex and State of Massachusetts, have invented certain Improvements in Machines for Operating on Metallic Fastenings, of which the following description, in connection with the accompanying drawings, is a specification, like reference characters on the drawings indicating like parts in the several figures.

This invention relates to machines for operating on metallic fastenings and will be hereinafter described as embodied in a machine for shaping the heads of nails including those of small size generally denominated "tacks."

The heads of nails or tacks as they are discharged from the nail making machines are often unsymmetrical and formed with burrs projecting from them. It is desirable for many purposes, for example, when the nails or tacks are used in the manufacture of shoes, that their heads be uniform in shape and size to permit them to be fed readily down the raceway of the machine by which they are inserted into the shoe and to enhance the appearance of the shoe.

One of the objects of the invention is to provide an improved machine for shaping the heads of nails, which will be simple in construction and efficient and reliable in operation and which can be operated at great speed so as to produce a large output. To this end, an important feature of the invention resides in the provision of means for transferring the nails directly from the stationary raceway by which they are supported in the machine to the shaping means, which preferably comprises a punch and a die. In the illustrated construction, the transferring means comprises a pair of gripping members which are successively closed upon the endmost fastenings in the raceway and convey them to the die.

Other important features of the invention pertain to the construction of the die, the independently operated jaws above and below the die for centering the head and body of the nail relatively to the opening of the die, the means for supporting the punch which engages the head of the nail and forces it through the opening in the die, the raceway which conducts the nails to the transferring means, and to mechanism for maintaining a steady flow of nails down the raceway.

Although the invention is herein shown as embodied in a machine for shaping the heads of nails, it is recognized that many of the features of the invention are not restricted thereto but may be used in other relations including use in machines of other types for operating on metallic fastenings. It is, therefore, not intended to limit the scope of the invention except as required by the claims.

Other objects and features of the invention will appear as the description proceeds and will be pointed out in the appended claims.

In the drawings,—

Fig. 3 shows the operating means for the gripping members and the separator;

Fig. 4 is a view of the slide which carries the gripping members;

Fig. 5 is a detail of the cam slide which controls the closing and releasing movements of the grippers;

Fig. 6 is a perspective view of the die carrying slide and the means for supplying the fastenings to be trimmed to the die with the die in lowered position and the grippers disposed to present a fastening in alinement with the opening of the die;

Fig. 7 is a view similar to Fig. 6 but showing the die carrying slide in raised position and the grippers retracted to receive a fastening from the raceway;

Fig. 8 is a view in detail of the die carrying slide;

Fig. 9 is a broken view of one of the frame members which guide the movements of the die carrying slide showing the cam members carried thereby for operating the jaws which center the fastening in the die;

Fig. 10 is a view in cross-section through the die carrying slide illustrating the character of the engagement of the fastening by the upper and lower centering jaws;

Fig. 11 is a view in cross-section of the punch supporting means and the die carrying slide;

Fig. 12 is a view in side elevation of the upper portion of the raceway;

Fig. 13 is a detail view of the raceway and parts associated therewith;

Fig. 14 is a view in cross-section of the means for attaching the two sides of the raceway together;

Fig. 15 illustrates the parts shown in Fig. 14 in separated relation;

Figure 1:
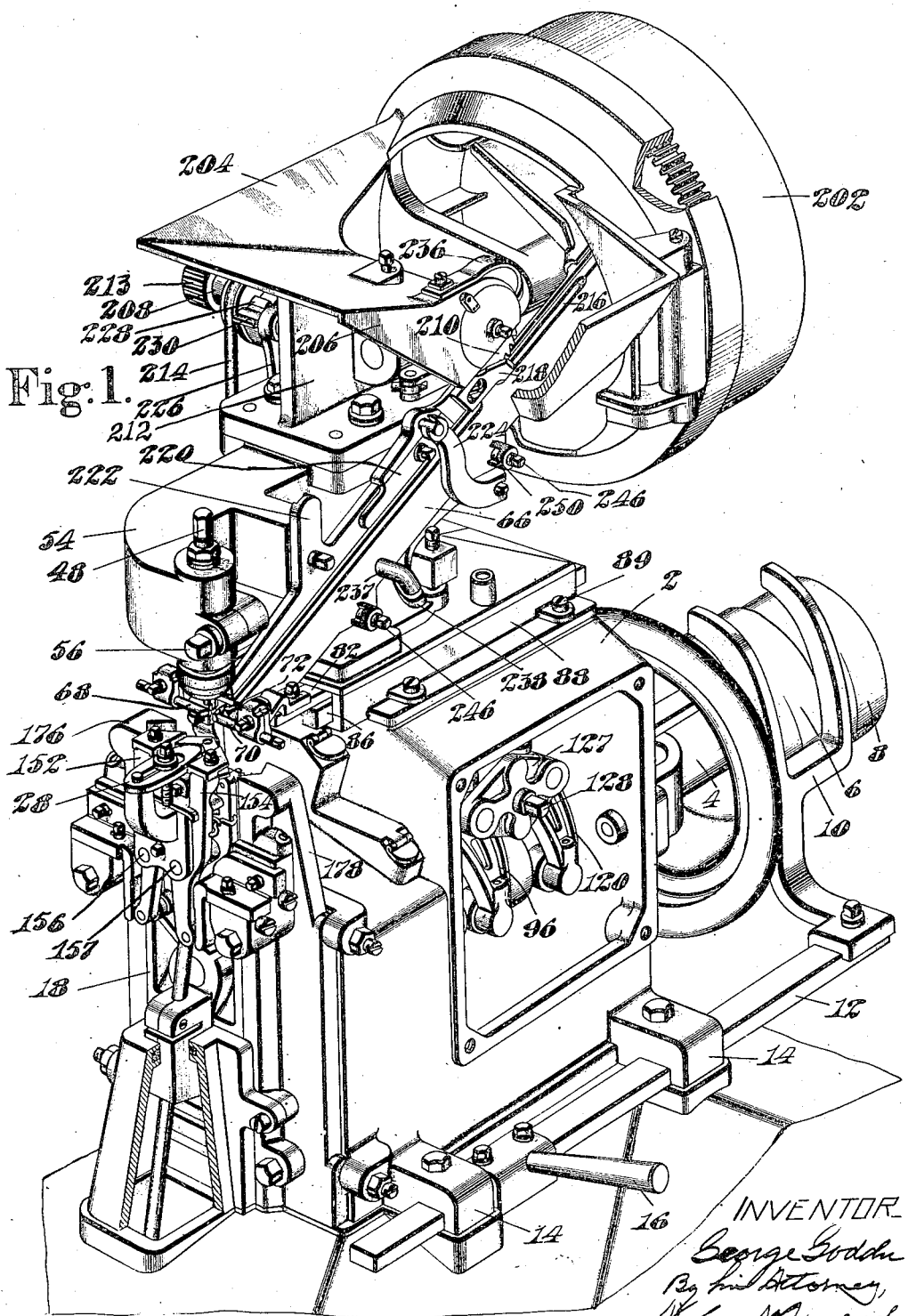
Fig. 1 is a perspective view of a machine according to the invention.

Fig. 16 exhibits the manner in which a fastening is gripped by the gripping members;

Fig. 17 shows the gripping members in perspective;

Fig. 18 is a view of the plate which secures the die button into the die carrying slide;

Fig. 19 depicts a tack as delivered from the tack making machine; and

Fig. 20 shows the tack after it has been operated upon by the machine of this invention.

The invention will be described as incorporated in a machine for trimming the heads of tacks such as are used in the manufacture of boots and shoes.

The frame 2 of the machine has mounted therein a drive shaft 4 carrying tight and loose pulleys 6 and 8 respectively. Movement is transmitted to the driving shaft 4 from any suitable source of power by a belt passing between the arms of a bifurcated member 10 carried by a bar 12 slidable in bearings 14 on the frame 2 and having a handle member 16 for manipulation by the operator.

Mounted on the front of the machine is a slide 18 carrying a die member 19 having an opening designed to receive the tacks one by one with their heads lying on the upper surface of the die. The slide 18 is operated to carry the head of a tack in the die into engagement with a stationary punch 20 by a cam 21 on the driving shaft 4 having a groove in its face which receives a roll 22 carried by the slide. Preferably, and as shown, the die member 19 is constructed in the form of a button which rests on the upper surface of a supporting member 24 socketed into the slide 18 and secured therein by a set screw 26. The button 19 has rounded sides converging toward its upper surface and is maintained in proper position on the member 24 by a plate 28 having a reduced extension or ear 29 provided with an opening 30, the wall of which is formed to fit over the button 19. The plate 28 is provided with slots 31 and 32, the former of which receives a screw bolt 34 for securing the plate to the slide 18 and the latter a pin 36 projecting from the upwardly extending portion 38 of the slide 18 and co-acting with the bolt 34 to aline the opening of the button 19 with the punch 20.

In the illustrated construction, the punch 20 is mounted in a chuck 44 secured within a sleeve 46 by a nut 48 which, when tightened, causes the split portions of the chuck to be clamped on the punch by reason of the engagement of their flared surfaces 50 with correspondingly flared surfaces at the lower end of the sleeve 46. The sleeve 46 is received within a second sleeve 52 mounted for vertical adjustment in a split bearing on the casting 54 forming part of the machine frame and capable of being secured in any of its various positions of adjustment by a screw 56. The sleeve 46 is of less diameter than the passage in the sleeve 52, thus permitting adjustment of said sleeve and consequently of the punch 20 in any direction desired. The sleeves 46 and 52 have lateral extensions 58 and 60 respectively, and the sleeve 46 is maintained in its various positions of adjustment relatively to the sleeve 52 by a nut 62 threaded on the upper end of the sleeve 46 and a screw 64 passing through a slot in the extension 60 and threaded into the extension 58. The nut 62 acts frictionally against the edge of the sleeve 52, washers or the like being preferably interposed between the nut and sleeve.

Figure 2:
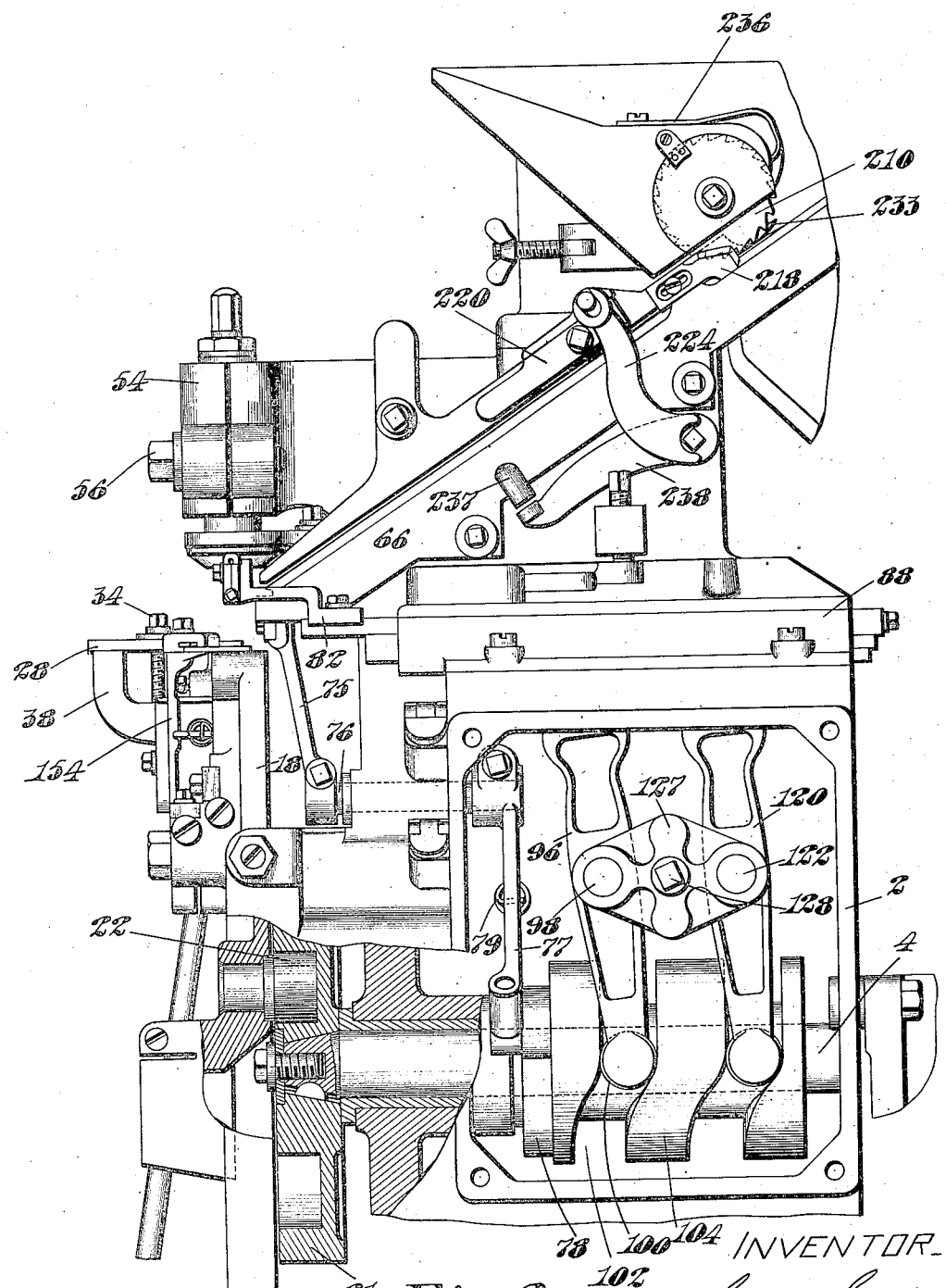
Fig. 2 is a view in side elevation, certain parts being shown in cross section.

The tacks are conducted to a point adjacent to the punch 20 and die 19 by a raceway 66 having a slot to receive the shanks of the tacks supported by their heads from the raceway. Means are provided for receiving the tacks successively from the raceway and transferring them directly to the die. In the illustrated embodiment of the invention, such means comprises gripping members 68 and 70 adapted to grasp the shank of the endmost tack in the raceway and movable together substantially in the vertical plane of the slot of the raceway to convey it to the die 19. The end of the raceway is shouldered or recessed at 72, and movable forwardly of and in substantial contact with the vertical surfaces at the rear of said recesses is a tack separator 74 (Fig. 6) functional normally to maintain the tacks against movement down the raceway. The separator 74 is secured to an arm 75 (Figs. 2 and 3) carried by a rock shaft 76 journaled in the frame 2 of the machine and having conected thereto an arm 77 operated in one direction by a cam 78 on the driving shaft 4 and in the opposite direction by a spring 79 connected to the arm 77 and to the frame. Lugs 80 project from the raceway so as to overhang the separator 74 for a purpose to be hereinafter described.

The gripping members 68 and 70 are carried by arms 81 and 82 fulcrumed at 83 and 84 respectively on a slide 86 mounted in a guideway 88 secured to the frame of the machine by screws 89. Pivoted in ears 90 and 92 on the slide is a block 94 embraced by the bifurcated upper end of a lever 96 mounted on a stud shaft 98 and having a roll 100 received in the cam groove 102 of a cylinder 104 on the shaft 4.

Movement of the slide 86 by the lever 96 carries the grippers 68 and 70 between the tack receiving position and a position in alinement with the opening of the die 19. The gripping members are closed on the rearendmost tack in the raceway when in receiving position and are opened when alined with the die to discharge the tack into the die. A spring 105 is interposed between the rear ends of the arms 81 and 82 and tends to move the grippers toward each other. The arms are provided with rolls 106 which engage recessed cam surfaces 108 and 109 on a cam slide 112 formed with shouldered portions 110 and 111 disposed forwardly of the recesses. The cam slide 112 is also mounted in the guideway 88 and depending therefrom are ears 114 and 116 bearing a pivoted block 118 which is engaged by the bifurcated upper end of an operating lever 120 carried by a stud 122 and having a roll 124 riding in a groove 126 of the cam cylinder 104. The levers 96 and 120 are retained on their respective shafts by a plate 127 attached to the frame by a bolt 128.

In order to adapt the gripping members to receive the tacks directly from the raceway, the gripping member 70 is formed with a concave tack engaging surface 129 extending inwardly from its rear surface 130 substantially to the middle of the member thus forming a recess to receive the shank of a tack, whereas the tack engaging surface 131 of the gripper 68 is inclined from its rear surface 132 away from the adjacent face of the gripper 70 so as to maintain the shank of the tack in the recess 129. In order better to engage the shank of the tack, the surface 131 of the gripper 68 is recessed slightly at 134 (Fig. 16). The construction and operation of the gripping members to receive the tacks from the raceway and convey them directly to the die 19 conduces greatly to the speed with which the machine may be operated.

The construction and arrangement of the gripper slide 86 and cam slide 112 and their operating means is such that, upon forward movement of the gripper slide to carry a tack to the die, the rolls 106 are moved from positions adjacent to the right hand ends of the cam recesses 108 and 109, as seen in Fig. 3, to positions adjacent to the shoulders 110 and 111 of said recesses. The gripper slide 86 being then held stationary, the cam slide 102 is moved rearwardly carrying the shouldered portions 110 and 111 into engagement with the rolls 106, thereby separating the gripping members 68 and 70 to permit the tack carried by them to fall into the die opening. Upon continued operation of the machine, the gripper slide 86 and cam slide 112 are moved together rearwardly, the rolls 106 being maintained on the shouldered portions 110 and 111 to retain the grippers in separated relation during a part of their return movement to clear the shank of the tack. The cam slide 112 is then moved forwardly while the rearward movement of the gripper slide continues, thus causing the rolls 106 to pass off the shoulders 110 and 111 into the recesses 108 and 109. When the gripper slide 86 approaches the limit of its rearward movement, the roll on the arm 81 rides onto the raised portion of the cam slide to the rear of the recess 108, that is, to the right of such surface as seen in Fig. 3, and thus moves the gripper 68 away from the gripper 70. The recess 109, however, is longer than the recess 108, in consequence of which the gripper 70 is not moved away from the gripper 68 upon the return movement of the grippers to tack receiving position, but the substantially straight rearward portion of its concave surface 129 is alined with the corresponding wall of the slot of the raceway. The grippers 68 and 70 are caused closely to approach the separator 74 which normally precludes movement of the tacks down the raceway so that, when the separator is retracted from its position in front of the raceway slot, the endmost tack moves downwardly, supported by the lugs 80 into the recess of the gripper 70, after which the cam slide 112 is withdrawn toward the right (Fig. 3) permitting the roll on the arm 81 to engage the recess 108 and thus cause the gripper 68 to grip or clamp the tack against the gripper 70. The separator 74, following the introduction of the endmost tack in the raceway into the grippers, is moved back into the path of the remaining tacks prior to the inception of the movement of the grippers toward the die.

The tack engaging surfaces 129 and 134 of the grippers (see Fig. 17) are elongated downwardly so as to maintain the tack in predetermined relation to the grippers, which are preferably so disposed as to present the tack to the die in vertical position and, to this end, are mounted for angular adjustment in split holders 136 and 138 on the arms 81 and 82 respectively, being held in adjusted position by screw bolts or the like 140 and 142. To facilitate the adjustment of the grippers, they are formed with angular heads 144 and 146 for engagement by a suitable tool. It will be manifest from the foregoing that the point of the tack in the grippers may be advanced or retarded as desired by turning the grippers in their holders.

It is essential that the heads of the tacks be accurately centered in the die, since otherwise they could not be uniformly and symmetrically shaped by the die. To this end, I provide two pairs of centering jaws one of which is located above the die to center the head of the tack prior to the engagement of the punch 20 therewith and the other below the die to center its shank both prior to and during the operation of the punch on the tack. In the illustrated construction, the upper centering jaws 148 and 150 are carried by arms 152 and 154 pivoted on studs 156 and 157. Plates 158 on the arms 152 and 154 are recessed adjustably to receive the jaws 148 and 150 and are caused to clamp the jaws against the arms by screw bolts or the like 159. The studs 156 and 157 are journaled in the slide 18 and in a plate 160 secured to the laterally extending portion 161 of the slide 18 by a screw 162.

The lower centering jaws 163 and 164 are received in grooves in the upper surface of the member 24 so as to underlie the die button 19 and are pivotally carried by arms 166 and 168 also pivoted on the studs 156 and 157. Both of the pairs of centering jaws are normally maintained in closed relation. As shown, this is accomplished by a spring 170 connected to U-shaped yokes 172 and 174 having their ends formed to engage the upper portions of levers 152, 166 and 154, 168 respectively. The yokes tend in all positions of the arms to move them toward each other, swinging about their connections with the spring 170 when the arms engaged thereby are moved relatively to each other.

In the illustrated construction, the slide 18 is guided in its movements by members 176 and 178 bolted to the machine frame. Preferably, the operating means for the upper and lower centering jaws is carried by said members and, as shown, that for the upper centering jaws comprises cam members 180 and 182 arranged to engage idler rolls on the arms 152 and 154 respectively and having screw and slot connections 184 and 186 with the members 176 and 178. The cam members 180 and 182 have shoulders 188 and 190 which operate upon upward movement of the slide 18 to open the upper centering jaws 148 and 150, just prior to the engagement of the head of the tack by the punch to permit it to drop down upon the die. The means for controlling the lower centering jaws 163 and 164 comprises cam members 192 and 193 adjustably secured to the members 176 and 178 by screw and slot connections 194 and 195 and having cam shoulders 196 and 198 between which is a depressed portion 199. Idler rolls on the arms 166 and 168 engage the cam members 192 and 193. When upward movement of the slide 18 has continued to a point such that the head of the tack is forced nearly through the opening of the die 19, the rolls on the arms 166 and 168 engage the shoulders 196 of the cam members 192 and 193, in consequence of which the jaws 163 and 164 are separated to permit the tack to be discharged from the die. The purpose of the shoulders 198 is again to separate the jaws 163 and 164 on the downward movement of the slide to insure the proper delivery of the tack to the tube 200 (Figs. 1, 2 and 11) by which it is conducted to a suitable receptacle. The provision of separate controlling means, such as the cam members 180, 182 and 192, 193, for the upper and lower centering jaws enables each pair of jaws to be opened at the exact time desired.

The tacks are supplied to the raceway 66 from a rotary hopper 202 of usual construction to which they are conducted by an inclined chute 204 having a vertically disposed plate 206 in which is journaled one end of a shaft 208 which carries a toothed clearing wheel 210 disposed over the slot of the raceway. The shaft 208 also passes through the plate 212 upon which the chute 204 is mounted and carries at its end a milled member 213 by which it may be rotated manually. The driving means for the shaft comprises a pulley over which passes a belt 214 which receives motion in any suitable manner (not shown) from the driving shaft 4. The clearing wheel 210 removes from the raceway any tacks which lie loosely thereon or whose shanks are not properly positioned in the raceway slot. In order to permit ready access to the portion of the raceway adjacent to the clearing wheel, a part of the chute 204 is pivoted to the machine frame so that it may be swung back.

The walls of the raceway are beveled or chamfered on their upper sides as indicated at 216 (Fig. 1) and movable along the beveled surfaces are members 218 adjustably connected to an actuating member 220 slidably mounted on the cover plate 222 of the raceway. The member 220 is reciprocated by an arm 224 having a pin and slot connection therewith and mounted on a rock shaft journaled in the frame of the machine. Also carried by the rock shaft (Fig. 1) is an arm 226 having a pin which is maintained against a toothed wheel 228 on the shaft 208 by a leaf spring 230 (Fig. 1). Upon rotation of the shaft 208, the member 220 is moved in one direction by the toothed wheel 228 and in the other by the spring 230. The members 218 operate adjacent to the point of closest approach of the clearing wheel 210 to the raceway and supplement the action of the wheel in removing the loose tacks therefrom.

The actuating member 220 has a curved forward surface 231 corresponding in shape to the periphery of the wheel 210 and converging toward the lower surface of said member to form a point 232. Extending from the member 220 is a blade 233 which is received in a groove in the periphery of the clearing wheel 210 and has its lower surface in alinement with the lower surface of the actuating member 220. The blade 233 and the groove of the clearing wheel 210 lie in the vertical plane of the raceway slot, and the end surface of the blade is inclined downwardly as indicated at 235. It frequently happens that tacks having their shanks disposed more or less vertically in the slot of the raceway do not drop all the way into the slot by reason, for example, of being too closely grouped in the slot. The heads of such tacks, when they come into engagement with the inclined surface 235, will be gradually forced downwardly into the slot. The blade 233 partakes, of course, of the reciprocations of the member 220 and by its movement agitates the tacks engaged by it as well as exerts pressure on their heads and thus works or manipulates them into proper position in the raceway slot. A clearing device 236 is connected to the chute 204 and has its end lying in the groove of the clearing wheel so as to remove therefrom any tacks which may become lodged therein.

In order to effect a steady and uninterrupted flow of tacks down the raceway, simple and efficient means are provided for vibrating the raceway. Preferably, the construction of the raceway vibrating means is such as to move the raceway both vertically and horizontally. As shown, such means comprises a projection 237 extending laterally from the side of the raceway and having a down-turned end against which impinges the end of an arm 238 carried by the rock shaft upon which the arm 224 which operates the actuating member 220 is mounted. The rock shaft and its associated parts accordingly constitute common operating means for the actuating member 220 and the raceway vibrating or jarring means.

The construction of the raceway 66 is preferably such that the slot may be adjusted better to adapt it for handling tacks of different sizes. To this end, it is formed in two sections comprised by bars 240 and 242 attached together by bolts 246 threaded into the frame 2 of the machine. Each of said bolts is surrounded by a sleeve 247 threaded into the bar 242 and abutting against the bar 240, by the rotation of which the bar 242 may be adjusted toward and from the bar 240 to regulate the width of the slot. The end of the sleeve 247 is preferably flattened on the sides as indicated at 248 (Fig. 15) to facilitate the adjustment of the sleeve by a suitable tool. Caps 250 are interposed between flanges on the bolts 246 and the section 242 of the raceway.

Since the arm 238 moves upwardly, it tends to move the raceway 66 upwardly, but, inasmuch as the arm 238 impinges against the projection 237 at a considerable distance laterally from the raceway 66, it also tends to turn the raceway in a horizontal direction about its points of support on the machine frame. Consequently, the arm 238 tends to impart to the raceway 66 a compound vertical and horizontal movement. Moreover, inasmuch as the raceway 66 comprises two independent bars supported as above described, the outer bar 242 upon which the projection 237 is provided is vibrated to a greater extent than the inner bar 240. The bars 240 and 242 are firmly clamped to the machine frame and are movable under the impulse of the arm 238 only to the extent permitted by their own resiliency and any unavoidable looseness in the attaching parts.

By reason of the irregular shapes of the heads of tacks when they are fed down the raceway of a trimming machine, they are more likely to clog than when they are fed down the raceway of a nailing machine after their heads have been trimmed to make them symmetrical and of uniform size. It has been found that clogging of tacks in the raceways of trimming machines is more effectively prevented and a more uniform feed of the tacks secured by the use of mechanism of the character herein described than by the use of devices which vibrate the raceways of the machines only in single planes, whether vertical or horizontal.

The manner of operation of the machine will, it is believed, be clearly apparent from the foregoing description, for which reason, a further exposition thereof is deemed unnecessary.

Having thus described my invention, what I claim as new and desire to secure by Letters Patent of the United States is:

1. In a machine for shaping the heads of nails, the combination with a punch and a die, of a stationary raceway constructed and arranged to support nails in upright position, and means movable between the raceway and the die for transferring the nails successively from the raceway to a position in alinement with the punch and die.

2. In a machine for shaping the heads of nails, the combination with a punch and a die, of a raceway constructed and arranged to support nails in upright position, and means for transferring the nails successively from the raceway to a position in alinement with the punch and die comprising gripping members movable substantially in the vertical plane of the raceway.

3. In a machine of the class described, means for shaping the head of a fastening, a stationary raceway constructed to support and guide the fastenings, and means for transferring the fastenings one by one directly from the raceway to the shaping means.

4. In a machine of the class described, means for operating upon headed fastenings, a raceway having a slot to receive the shanks of fastenings supported by their heads from the raceway, and means for successively moving the fastenings substantially in the vertical plane of the slot of the raceway to transfer them from the raceway to the operating means.

5. In a machine of the class described, means for operating on nails, a raceway constructed and arranged to support the nails in upright position, means for isolating the foremost nail in the raceway from the remaining nails, and means movable in a path substantially parallel to the vertical plane of the raceway for transferring the isolated nail to the operating means.

6. In a machine of the class described, means for operating upon the heads of fastenings, a stationary raceway constructed to support the fastenings in upright position, means for isolating the foremost fastening in the raceway from the remaining fastenings, and means for transferring the isolated fastening directly from the raceway to the operating means, said transferring means comprising a pair of gripping members movable toward and from each other to grip and release the fastening.

7. In a machine of the class described, means for shaping the heads of fastenings, a raceway, and means for transferring the fastenings successively from the raceway to the shaping means comprising gripping members movable together from the raceway to the shaping means, means for closing the gripping members upon the shank of a fastening in the raceway, means for moving said members to carry the fastening to the shaping means, and means for opening said members to release the fastening after it has been carried to the shaping means.

8. In a machine for shaping the heads of nails, the combination with a punch and a die, of a raceway constructed to support nails in upright position, means for isolating the foremost nail in the raceway from the remaining nails, gripping members for transferring the isolated nail directly from the raceway into alinement with the punch and die, and means for closing the gripping members on said nail.

9. In a machine of the class described, means for shaping the heads of fastenings, an inclined raceway having a slot to receive the shanks of fastenings supported by their heads from the raceway, means for transferring the fastenings from the raceway to the shaping means comprising gripping members movable to a position to receive the endmost fastening in the raceway between them, means for controlling the fastenings in the raceway, and means for operating the controlling means to permit movement of the endmost fastening between the gripping members and to retain the remaining fastenings in the raceway upon movement of the gripping members away from the raceway.

10. In a machine of the class described, means for shaping the heads of fastenings, a raceway constructed to support the fastenings in upright position, gripping members operable to transfer the fastenings successively from the raceway to the shaping means, a slide upon which said members are mounted, and means for moving the slide in a path substantially parallel to the vertical plane of the raceway.

11. In a machine of the class described, means for operating on the heads of fastenings, a raceway adapted to support the fastenings in upright position, and means for transferring the fastenings successively from the raceway to the operating means comprising a slide movable in a path substantially parallel to the vertical plane of the raceway, gripping members pivotally mounted on said slide, means for operating the slide, and means for effecting movements of the gripping members relatively to each other.

12. In a machine of the class described, means for operating on the heads of fastenings, a raceway, and means for transferring the fastenings successively from the raceway to the operating means comprising a slide, arms pivotally mounted on said slide, gripping members carried by said arms, means for operating the slide, and cam means movable relatively to the slide and operable on said arms to effect relative movements of the gripping members.

13. In a machine of the class described, means for operating on fastenings, a raceway having a slot adapted to receive the shanks of fastenings, and means for transferring fastenings from the raceway to the operating means comprising a slide movable substantially in the vertical plane of the slot, arms carried by the slide, gripping members mounted in said arms, and a cam slide for effecting relative movement of the gripping members.

14. In a machine for shaping the heads of nails, the combination with a punch and a die, of a raceway constructed to support nails in upright position, and gripping members for transferring the nails from the raceway to the punch and die formed with elongated surfaces rigidly to support the nails during their transfer to the punch and die and disposed to present the nails to the die in upright position.

15. In a machine for shaping the heads of nails, the combination with a punch and a die, of a raceway, gripping members for transferring the nails from the raceway to the die formed with nail engaging surfaces shaped rigidly to support the nails during their transfer to the die and to control the disposition of the nails relatively to the die, and means for supporting the gripping members for angular adjustment to aline the nails properly with the die.

16. In a machine of the class described, means for operating on nails, a raceway, and means for transferring the nails from the raceway toward the operating means comprising gripping members, one of said members being formed with a concave nail engaging surface extending inwardly from the side of the member and the other of said members having a nail engaging surface disposed to clamp the nail into the recess formed by said concave surface.

17. In a machine of the class described, means for operating on fastenings, a raceway having a slot to receive the shanks of fastenings supported by their heads from the raceway, and means for transferring the fastenings from the raceway toward the operating means comprising gripping members, one of said members having a concave engaging surface extending inwardly from the side of the member, and operating means for the gripping members constructed to position said gripping member with its engaging surface substantially in line with the corresponding wall of the raceway slot to permit movement of a fastening into the recess formed by said concave surface and to move the other gripping member to clamp the fastening in said recess.

18. In a machine of the class described, the combination with a punch and a die, of means above the opening of the die for centering the head of a fastening relatively to the die, means below the opening of the die for centering the body of the fastening in the die, and independent means for operating said upper and lower centering means.

19. In a machine of the class described, the combination with a punch and a die, of a pair of jaws located above the opening of the die to center the head of a fastening relatively to said opening, a second pair of jaws located below the die to center the body of the fastening, means for opening the upper centering jaws to permit the head of the fastening to fall down upon the die prior to the operation of the punch thereon, and means independent of the means for opening the upper centering jaws for opening the lower centering jaws.

20. In a machine of the class described, the combination with a punch and a die, of a slide for carrying the die, a pair of jaws located above the opening of the die to center the head of a fastening relatively to said opening, a second pair of jaws below the die to center the body of the fastening, means for moving the slide to carry the head of the fastening into engagement with the punch, and separate means operable by movement of the slide for opening the pairs of jaws.

21. In a machine of the class described, the combination with a punch and a die, of a slide for carrying the die, a pair of jaws located above the opening of the die to center the head of a fastening relatively to said opening, means for moving the slide to carry the head of the fastening into engagement with the punch, cam means operable upon such movement of the slide to open the upper centering jaws prior to the engagement of the punch with the head of the fastening, and independent cam means operable upon such movement of the slide for opening the lower centering jaws subsequent to the engagement of the punch with the head of the fastening.

22. In a machine of the class described, the combination with a punch and a die, of a frame, a member slidably mounted on the frame and carrying the die, jaws carried by said member for engagement with the fastening above the opening of the die for centering the head of the fastening relatively to said die, jaws carried by said member below the opening of the die for centering the body of the fastening, means for moving said member to carry the head of the fastening into engagement with the punch, and independent means carried by the frame and operable upon such movement of the slide to open said centering jaws.

23. In a machine of the class described, the combination with a punch and a die, of a slide carrying said die, arms fulcrumed on said slide, centering jaws mounted an said arms and positioned above and below the opening of the die, independent means operable on the arms carrying the upper centering jaws and the lower centering jaws respectively to open the jaws, and means common to said arms for effecting closing movement of the jaws.

24. In a machine of the class described, the combination with a punch and a die, of a slide carrying said die, arms fulcrumed on said slide, upper and lower centering jaws mounted in said arms, means operable on said arms to open the centering jaws, and means common to said arms and tending to move the jaws to closed position.

25. In a machine of the class described, the combination of a punch and a die, means for delivering fastenings to the die, means for moving the die to carry the head of a fastening in the die into engagement with the punch, a pair of jaws movable with the die and located below the die for centering the body of the fastening relatively to the die, and cam members operable upon such movement of the die to open the jaws.

26. In a machine of the class described, the combination with a punch and a die, of means for delivering fastenings to the die, centering jaws located below the opening of the die, a slide carrying said die and centering jaws, means for moving the slide to carry the head of a fastening in the die into engagement with the punch, and stationary cam members operable subsequent to the engagement of the punch with the head of the fastening to open the centering jaws.

27. In a machine of the class described, the combination with a punch and a die, of means for delivering fastenings to the die, a frame, a slide movable on said frame and carrying said die, arms fulcrumed on said slide, centering jaws carried by said arms and located beneath the opening of the die, means for moving said slide to carry the head of a fastening in the die into engagement with the punch, cam members carried by the frame and operable upon said arms upon such movement of the slide to open the centering jaws, and means tending to maintain said jaws in closed relation.

28. In a machine of the class described, the combination with a punch and a die, of a slide carrying the die, means for moving the slide, centering jaws carried by the slide beneath the opening of the die, and means for opening said centering jaws upon movement of the slide both to uppermost and lowermost positions to insure the delivery of the fastenings from said jaws.

29. In a machine of the class described, a raceway constructed and arranged to conduct fastenings supported by their heads and formed with a slot to receive the shanks of the fastenings, means for delivering fastenings to said raceway, and a clearing wheel mounted above the raceway and having a groove alined with the slot of the raceway.

30. In a machine of the class described, a raceway constructed and arranged to conduct fastenings supported by their heads and formed with a slot to receive the shanks of the fastenings, means for delivering fastenings to the raceway, a cover plate overlying the slot of the raceway, and a member slidably mounted on the cover plate and provided with an inclined lower surface converging toward the upper surface of the raceway in the direction of movement of the fastenings down the raceway and operating to position the fastenings in the slot of the raceway.

31. In a machine of the class described, a raceway constructed and arranged to conduct fastenings supported by their heads and formed with a slot to receive the shanks of the fastenings, means for delivering fastenings to the raceway, a clearing wheel provided with a groove in alinement with the slot of the raceway, and a member located within the groove of the clearing wheel and extending rearwardly of said wheel in the direction of movement of the fastenings down the raceway for thrusting the fastenings down into the slot of the raceway in advance of the point of operation of the clearing wheel thereon.

32. In a machine of the class described, a raceway constructed and arranged to conduct fastenings supported by their heads and formed with a slot to receive the shanks of the fastenings, means for delivering fastenings to the raceway, a clearing wheel, and means for working the fastenings down into the slot of the raceway prior to the operation of the clearing wheel thereon comprising a member overlying the slot of the raceway and formed with an inclined surface positioned for engagement with the heads of the fastenings.

33. In a machine of the class described, a raceway constructed and arranged to conduct headed fastenings supported by their heads and formed with a slot to receive the shanks of the fastenings, means for delivering fastenings to the raceway, a cover plate overlying the slot of the raceway, and a member slidably mounted on sa'd plate for movement in line with the slot of the raceway and having parts arranged in the vertical planes of the walls of the raceway to remove any fastenings lying transversely of the raceway and a blade portion overlying the slot of the raceway and formed with a surface inclined downwardly in the direction of movement of the fastenings in the raceway to engage the heads of the fastenings and position them properly in the raceway slot.

34. In a machine of the class described, a raceway constructed and arranged to conduct fastenings supported by their heads and formed with a slot to receive the shanks of the fastenings, means for delivering fastenings to the raceway, a toothed clearing wheel for removing fastenings lying loosely on the raceway, a cover plate overlying the slot of the raceway, and means carried by the plate for operating on the fastenings in advance of the operation of the clearing wheel thereon to manipulate them down into the slot of the raceway.

35. In a machine of the class described, a raceway constructed and arranged to conduct fastenings supported by their heads and formed wih a slot to receive the shanks of the fastenings, means for delivering fastenings to the raceway, a cover plate overlying the slot of the raceway, a member slidably mounted on said cover plate and provided with a pointed end overlying the slot of the raceway and spaced therefrom by a distance such as to engage improperly positioned fastenings but to permit properly positioned fastenings to pass therebeneath, and means carried by said member extending rearwardly of the pointed end of the member in the direction of movement of the fastenings in the raceway for properly positioning the fastenings in the slot of the raceway during their passage to said pointed end.

36. In a machine of the class described, a raceway, and means for jarring said raceway constructed and arranged to impart thereto a compound up and down movement and a lateral movement.

37. In a machine of the class described, a raceway, a member projecting laterally from the side of the raceway, and means for imparting blows on said member at a point spaced from the side of the raceway so as to vibrate said raceway both in a vertical and horizontal plane.

38. In a machine of the class described, a raceway, a member projecting laterally from the raceway and having its end deflected substantially in a vertical plane, and means for imparting blows successively upon the end of said member to jar the raceway to facilitate the movement of fastenings down the raceway.

39. In a machine of the class described, a raceway formed with a slot to receive the shanks of fastenings supported by their heads from the raceway, a member mounted for movement relatively to the raceway to position the fastenings in the slot of the raceway, means for jarring the raceway, and common operating mechanism for said means and said member.

40. In a machine of the class described, a raceway formed with a slot to receive the shanks of fastenings supported by their heads from the raceway, a cover plate overlying the slot of the raceway, a member slidably mounted on the cover plate for manipulating the fastenings into the slot of the raceway, means for jarring the raceway, and common means for operating said member and said jarring means.

41. In a machine of the class described, a raceway comprising members spaced from each other to form a slot to receive the shanks of fastenings supported by their heads from the raceway, means for adjusting said members toward and from each other to vary the width of said slot, and means separate from the adjusting means for clamping the members in adjusted relation.

42. In a machine of the class described, a raceway comprising bars spaced from each other to form a slot to receive the shanks of fastenings supported by their heads from the raceway, members threaded into one of said bars and abutting against the other bar for adjusting said bars relatively to each other to vary the width of the raceway slot, and means for securing said bars together.

43. In a machine of the class described, a frame, a raceway comprising bars spaced from each other to form a slot to receive the shanks of fastenings supported by their heads from the raceway, sleeved members threaded into one of said bars and abutting against the other bar for adjusting said bars relatively to each other to vary the width of the raceway slot, and bolts passing through said sleeved members for securing the bars together and to the frame.

44. In a machine of the class described, the combination with a punch, of a chuck in which the punch is mounted, means for supporting the chuck comprising a sleeve having an opening formed therein of greater diameter than the diameter of the chuck to permit movements of adjustment of the chuck within the sleeve, and means for securing the chuck in its various positions of adjustment.

45. In a machine of the class described, the combination of a frame, a sleeve mounted loosely on the frame for free bodily movement relatively thereto, a punch carried by said sleeve, and means for securing the sleeve in various positions of adjustment on said frame.

46. In a machine of the class described, a frame, a sleeve mounted for vertical adjustment on the frame, means for securing said sleeve in adjusted position, a second sleeve mounted within the first-mentioned sleeve and of less diameter than the opening in the first-mentioned sleeve, and means co-acting with the upper part of said second sleeve to secure it in adjusted position relatively to the first-mentioned sleeve.

47. In a machine of the class described, a frame, a sleeve mounted for vertical adjustment on the frame, means for securing said sleeve in adjusted position, a second sleeve of less diameter than the opening in the first-mentioned sleeve mounted therein, a punch carried by the second-mentioned sleeve, and means co-acting with the upper part of the second-mentioned sleeve for securing it in adjusted position relatively to the first-mentioned sleeve, said means comprising a member overlying the first-mentioned sleeve, and means for operating it into frictional engagement with the first-mentioned sleeve.

48. In a machine of the class described, the combination of a frame, a sleeve carried by the frame and having a lateral extension at its end, a second sleeve mounted within the first-mentioned sleeve and of a less diameter than the opening of the first-mentioned sleeve and having a lateral extension paralleling the lateral extension of the first-mentioned sleeve, a punch carried by the second-mentioned sleeve, means for securing the second-mentioned sleeve in adjusted position relatively to the first-mentioned sleeve comprising a member carried by the second-mentioned sleeve and adapted for frictional engagement with the end of the first-mentioned sleeve, and means for securing the lateral extensions of the sleeves together.

49. In a machine of the class described, the combination of a supporting member having a vertical opening therein to receive depending headed fastenings, a die member in the form of a button fitted into the upper surface of the supporting member, and means for securing the die member removably in position on the supporting member.

50. In a machine of the class described, the combination of a die having an opening therein to receive fastenings, a support for the die, a button fitted into the upper surface of the die, means for securing the button removably in position on the die comprising a plate having a portion adapted to fit over the outer surface of said button and another portion adapted to be removably secured to the support for the die, and means for securing the plate to the die support.

51. In a machine of the class described, a punch, a die member having an opening to receive the punch, means for moving the die member upwardly to carry a fastening in the die member against the punch, a raceway, means for successively isolating the endmost fastening in the raceway from the remaining fastenings, and devices operable to engage the isolated fastenings successively and to transfer them in a single operation from the raceway to a position in alinement with the opening of the die member and between the die member and the punch so as to cause the fastenings to enter the opening of the die member when the die member is elevated toward the punch.

52. In a machine of the class described, a punch, a die member having an opening to receive the punch, a raceway constructed to support nails in upright position and having a slot to receive the shanks of the nails, means for transferring the nails one by one directly from the raceway to a position in alinement with the punch and the opening in the die member and between the punch and the die member, and means for raising the die member intermittently toward the punch to cause the nails to enter the opening of the die member and the heads of the nails to be carried against the punch.

53. In a machine of the class described, a punch, a die member having an opening to receive the punch, a raceway constructed to support nails in upright position and having a slot to receive the shanks of the nails, devices movable substantially in the horizontal plane of the delivery end of the raceway for transferring the nails one by one directly from the raceway to a position in alinement with the punch and the opening in the die member, and means for raising the die member intermittently toward the punch to cause the nails to enter the opening of the die member and the heads of the nails to be carried against the punch.

54. In a machine of the class described, the combination of a punch, a die member having an opening to receive the punch, means for moving the die member toward the punch to cause the punch to operate on a fastening in the die member, a raceway, and means for transferring fastenings one by one directly from the raceway to a position in alinement with the opening of the die member and between the die member and the punch so as to cause the fastenings to enter the opening of the die member upon successive movements of the die member toward the punch.

55. In a machine of the class described, a raceway, a member projecting from the raceway and having an inclined end, and means for imparting blows successively upon the inclined end of said member to jar the raceway to facilitate the movement of fastenings down the raceway.

56. In a machine of the class described, the combination of a raceway for transmitting headed fastenings in an orderly series, and means for vibrating the raceway to facilitate the passage of fastenings therethrough.

In testimony whereof I have signed my name to this specification.

GEORGE GODDU.